United States Patent
Niu et al.

(10) Patent No.: US 10,392,937 B2
(45) Date of Patent: Aug. 27, 2019

(54) CONSTRUCTION LAYOUT FOR CAVERNS OF UNDERGROUND NUCLEAR POWER PLANT

(71) Applicant: CHANGJIANG SURVEY PLANNING DESIGN AND RESEARCH CO., LTD., Wuhan (CN)

(72) Inventors: Xinqiang Niu, Wuhan (CN); Qigui Yang, Wuhan (CN); Baixing Liu, Wuhan (CN); Lixin Liu, Wuhan (CN); Xin Zhao, Wuhan (CN); Lijun Su, Wuhan (CN); Feng Li, Wuhan (CN); Xuehong Yang, Wuhan (CN); Feng Zhao, Wuhan (CN); Xia Hua, Wuhan (CN); Min Li, Wuhan (CN); Weina Yu, Wuhan (CN); Maohua Li, Wuhan (CN); Fei Yu, Wuhan (CN)

(73) Assignee: CHANGJIANG SURVEY PLANNING DESIGN AND RESEARCH CO., LTD., Wuhan (CN)

( * ) Notice: Subject to any disclaimer, the term of this patent is extended or adjusted under 35 U.S.C. 154(b) by 378 days.

(21) Appl. No.: 15/376,689

(22) Filed: Dec. 13, 2016

(65) Prior Publication Data

US 2018/0003056 A1 Jan. 4, 2018

Related U.S. Application Data

(63) Continuation-in-part of application No. PCT/CN2015/079887, filed on May 27, 2015.

(30) Foreign Application Priority Data

Jun. 13, 2014 (CN) .......................... 2014 1 0265965
Jun. 13, 2014 (CN) .................... 2014 2 0318554 U

(51) Int. Cl.
*E21D 13/00* (2006.01)
*E02D 29/045* (2006.01)
(Continued)

(52) U.S. Cl.
CPC ............... *E21D 13/00* (2013.01); *E21D 9/14* (2013.01); *G21D 1/00* (2013.01); *G21C 1/00* (2013.01); *Y02E 30/40* (2013.01)

(58) Field of Classification Search
CPC ... E02D 29/063; E02D 29/073; E02D 29/077; E02D 29/12; E21D 1/06; E21D 9/08; E21D 9/10; E21D 11/385
(Continued)

(56) References Cited

U.S. PATENT DOCUMENTS

| 2,896,417 | A | * | 7/1959 | Meade | F17C 3/005 405/53 |
| 2,928,248 | A | * | 3/1960 | Hubbell | B65G 5/00 299/19 |
| 3,068,654 | A | * | 12/1962 | Warren | B65G 5/00 299/10 |
| 4,045,963 | A | * | 9/1977 | Hansson | B65G 5/00 405/53 |
| 4,233,789 | A | * | 11/1980 | Dinardo | E02D 27/38 405/53 |

(Continued)

*Primary Examiner* — Benjamin F Fiorello
*Assistant Examiner* — Edwin J Toledo-Duran
(74) *Attorney, Agent, or Firm* — Matthias Scholl P.C.; Matthias Scholl

(57) ABSTRACT

A construction layout for caverns of an underground nuclear power plant, including: two primary caverns accommodating nuclear reactor powerhouses, electric powerhouse caverns, safe powerhouse caverns, auxiliary powerhouse caverns, nuclear fuel powerhouse caverns, connecting powerhouse caverns, a first primary traffic tunnel, a third primary traffic tunnel, a second primary traffic tunnel, a fourth primary traffic tunnel, and a primary steam channel. The electric powerhouse caverns, the safe powerhouse caverns, and the nuclear fuel powerhouse caverns are arranged along the longitudinal direction of the mountain. Each of the safe powerhouse caverns and each of the nuclear fuel powerhouse caverns are disposed on two sides of each of the two primary caverns in the longitudinal direction of the
(Continued)

mountain, respectively. Each of the electric powerhouse caverns and each of the safe powerhouse caverns are located on a same side of each the two primary caverns.

10 Claims, 3 Drawing Sheets

(51) Int. Cl.
*E21D 9/14* (2006.01)
*G21D 1/00* (2006.01)
*G21C 1/00* (2018.01)

(58) Field of Classification Search
USPC .......... 405/55, 133, 134, 136, 137, 138, 139
See application file for complete search history.

(56) References Cited

U.S. PATENT DOCUMENTS

| | | | | |
|---|---|---|---|---|
| 4,363,563 A | * | 12/1982 | Hallenius | B65G 5/00 405/53 |
| 4,474,506 A | * | 10/1984 | Sagefors | B65G 5/00 405/132 |
| 4,572,707 A | * | 2/1986 | Sagefors | E21D 13/00 405/53 |
| 4,708,523 A | * | 11/1987 | Sagefors | E21D 13/00 405/129.35 |
| 5,855,452 A | * | 1/1999 | Sagefors | E21D 13/00 405/133 |
| 8,714,874 B2 | * | 5/2014 | Tunget | E21B 21/12 405/53 |

* cited by examiner

CONSTRUCTION LAYOUT FOR CAVERNS OF UNDERGROUND NUCLEAR POWER PLANT

CROSS-REFERENCE TO RELATED APPLICATIONS

This application is a continuation-in-part of International Patent Application No. PCT/CN2015/079887 with an international filing date of May 27, 2015, designating the United States, now pending, and further claims foreign priority benefits to Chinese Patent Application No. 201410265965.3 filed Jun. 13, 2014, and to Chinese Patent Application No. 201420318554.1 filed Jun. 13, 2014. The contents of all of the aforementioned applications, including any intervening amendments thereto, are incorporated herein by reference. Inquiries from the public to applicants or assignees concerning this document or the related applications should be directed to: Matthias Scholl P. C., Attn.: Dr. Matthias Scholl Esq., 245 First Street, 18th Floor, Cambridge, Mass. 02142.

BACKGROUND OF THE INVENTION

Field of the Invention

The invention relates to a construction layout for caverns of an underground nuclear power plant.

Description of the Related Art

Conventional construction layouts for caverns of an underground nuclear power plant leave much to be desired. In general, the distribution of the caverns is irregular, which means parts of the terrain are heavily excavated posing hidden risks. In addition, the random distribution of the primary caverns adversely affects the construction of adits. This delays the construction time and increases the investment cost.

SUMMARY OF THE INVENTION

In view of the above-described problems, it is one objective of the invention to provide an improved construction layout for caverns of an underground nuclear power plant that is highly modularized and allows for expedient construction of the power plant.

To achieve the above objective, in accordance with one embodiment of the invention, there is provided a construction layout for caverns of an underground nuclear power plant. The construction layout comprising: two primary caverns accommodating nuclear reactor powerhouses, electric powerhouse caverns, safe powerhouse caverns, auxiliary powerhouse caverns, nuclear fuel powerhouse caverns, connecting powerhouse caverns, a first primary traffic tunnel, a third primary traffic tunnel, a second primary traffic tunnel, a fourth primary traffic tunnel, and a primary steam channel. Each electric powerhouse cavern, each safe powerhouse cavern, each nuclear auxiliary powerhouse cavern, each nuclear fuel powerhouse cavern, and each connecting powerhouse cavern form a circle surrounding each primary cavern. The connecting line of medial axes of the two primary caverns is perpendicular to the longitudinal direction of a mountain in which the underground nuclear power plant is constructed. The electric powerhouse caverns, the safe powerhouse caverns, and the nuclear fuel powerhouse caverns are arranged along the longitudinal direction of the mountain. The auxiliary powerhouse caverns and the connecting powerhouse caverns are arranged perpendicular to the longitudinal direction of the mountain. Each of the safe powerhouse caverns and each of the nuclear fuel powerhouse caverns are disposed on two sides of each of the two primary caverns in the longitudinal direction of the mountain, respectively. Each of the electric powerhouse caverns and each of the safe powerhouse caverns are located on a same side of each the two primary caverns. Each of the auxiliary powerhouse caverns and each of the connecting powerhouse cavern are disposed on two sides of each of the two primary caverns perpendicular to the longitudinal direction of the mountain. The first primary traffic tunnel and the third primary traffic tunnel are disposed on two sides of two primary caverns in the longitudinal direction of the mountain. The second primary traffic tunnel is disposed between the two primary caverns. The first primary traffic tunnel communicates with the third primary traffic tunnel via the fourth primary traffic tunnel. One end of the second primary traffic tunnel communicates with the fourth primary traffic tunnel. The other ends of the first primary traffic tunnel, the second primary traffic tunnel, and the third primary traffic tunnel communicates with a ground surface. Each of the two primary caverns communicates with a corresponding connecting powerhouse cavern via the primary steam channel communicating with the ground surface. A skewback or an endwall of a top arch of each cavern of the nuclear island powerhouse cavern group communicates with the ground surface via a top adit system functioned in construction. A bottom of a sidewall of each cavern of the nuclear island powerhouse cavern group communicates with the first primary traffic tunnel, the second primary traffic tunnel, the third primary traffic tunnel, the fourth primary traffic tunnel, and the primary steam channel via a bottom adit system functioned as a slag discharging channel.

In a class of the embodiment, the top adit system comprises: a first primary adit a first top adit of a first primary cavern, a second top adit of a second primary cavern, a second primary adit a third primary adit a fourth primary adit third top adits of the nuclear fuel powerhouse caverns, fourth top adits of the connecting powerhouse caverns, fifth top adits of the electric powerhouse caverns, seventh top adits of the safe powerhouse caverns, an eighth top adit of the auxiliary powerhouse caverns, and ninth top adits of the safe powerhouse caverns. An elevation of the first primary adit is higher than an elevation of the second primary adit an elevation of the third primary adit and an elevation of the fourth primary adit. The first primary adit is connected to a skewback of a top arche of the first primary cavern and a skewback of a top arche of the second primary cavern via the first top adit and the second top adit respectively. The second primary adit and the fourth primary adit are respectively connected to endwalls of top arches of outer end faces of the two auxiliary powerhouse caverns. Two ends of the eighth top adit are respectively connected to endwalls of top arches of inner end faces of the two nuclear auxiliary powerhouse cavern. One end of the third primary adit is connected to a middle section of the eighth top adit. The second primary adit is connected to an endwall of a top arch of a first nuclear fuel powerhouse cavern via one of the third top adits. The third primary adit is connected to an endwall of a top arch of a second nuclear fuel powerhouse cavern via the other of the third top adits. The third primary adit is connected to an endwall of a top arch of a first connecting powerhouse cavern via one of the fourth top adits. The fourth primary adit is connected to an endwall of a top arch of a second connecting powerhouse cavern via the other of the fourth top adits. The fourth top adits are connected to endwalls of top arches of the electric powerhouse caverns via the fifth top adits respectively. The third primary adit is connected to an endwall of a top arch of one end of a first safe powerhouse cavern via one of the seventh top adits. The eighth top adit is branched to form one of the ninth top adits connected to an endwall of a top arche of the other end of the first safe powerhouse cavern. One of the ninth top adits is disposed between an inner end face of a first nuclear auxiliary powerhouse cavern and the third primary adit. The fourth primary adit is branched to form the other of the seventh top adits. The other of the seventh top adits and the other of the ninth top adits are connected to endwalls of top arches of two ends of a second safe powerhouse cavern.

In a class of the embodiment, each top adit of the top adit system has a longitudinal slope smaller than 12%.

In a class of the embodiment, the bottom adit system comprises: first bottom adits of the two primary caverns, second bottom adits of the electric powerhouse caverns, third bottom adits of the safe powerhouse caverns, fourth bottom adits of the auxiliary powerhouse caverns, fifth bottom adits of the nuclear fuel powerhouse caverns, and sixth bottom adits of the auxiliary powerhouse caverns. The first primary traffic tunnel is connected to a bottom of a sidewall of a first primary cavern via one of the first bottom adits. The second primary traffic tunnel is connected to a bottom of a sidewall of a second primary cavern via the other of the first bottom adits. Each primary steam channel is connected to a bottom of a sidewall of corresponding electric powerhouse cavern via each second bottom adit. The two third bottom adits are disposed on the fourth primary traffic tunnel and are connected to bottoms of endwalls of corresponding safe powerhouse caverns. The two fifth bottom adit are disposed on the fourth primary traffic tunnel and are connected to bottoms of endwalls of corresponding nuclear fuel powerhouse caverns. The two fifth bottom adit are connected to bottoms of endwalls of one ends of corresponding auxiliary powerhouse caverns via sixth bottom adits of the auxiliary powerhouse caverns; The two third bottom adit are connected to bottoms of endwalls of the other ends of corresponding auxiliary powerhouse caverns via fourth bottom adits of the auxiliary powerhouse caverns.

In a class of the embodiment, each bottom adit of the bottom adit system has a longitudinal slope smaller than 15%.

In a class of the embodiment, the two primary caverns are provided with first apparatus conveying channels for communicating with a corresponding connecting powerhouse caverns. A bottom of a sidewall of each of the connecting powerhouse caverns communicates with the ground surface via a second apparatus conveying channel.

Advantages of the construction layout of the circular-shaped nuclear island cavern group of the underground nuclear power plant according to embodiments of the invention are summarized as follows:

The primary traffic tunnels having the elevation of A m are fully utilized to construct bottom adits of the powerhouse caverns as the slag discharging channels and to construct top adits of the powerhouse caverns as the construction channels communicating with the ground surface, so that the construction of the powerhouse caverns can be organized using the fewest construction channels according to the ore pass method (the ore pass method refers to arrange a slage discharging pit in a vertical direction between an upper channel and a lower channel in an excavation region, use the upper channel as the construction channel, and introduce slags produced in the construction to the lower channel via the slag discharging pit so as to carry the slag out of the construction site). Each powerhouse cavern is only provided with the bottom adits and the top adits. The top adit system communicates with the top arches of the powerhouses and the bottom adit system communicates with the bottom of the walls of the powerhouses.

A bottom layer of each connecting powerhouse cavern adopts the primary steam channel as the construction channel, and the top layer of the connecting powerhouse cavern is configured with the fourth top adit. Each nuclear auxiliary powerhouse cavern is configured with the fourth bottom adit and sixth bottom adit at the bottom layer and is configured with the second primary adit, the fourth primary adit, and the eighth top adit at the top layer. The safe powerhouse cavern is configured with the third bottom adit at the bottom layer and is configured with the seventh top adit and the ninth top adit at the top layer. The nuclear fuel powerhouse cavern is configured with the fifth bottom adit at the bottom layer and is configured with third top adit at the top layer. The electric powerhouse cavern is configured with a second bottom adit at the bottom layer and is configured with fifth top adit at the top layer.

Bottom adits of the primary cavern, the electric powerhouse cavern, the safe powerhouse cavern, the connecting powerhouse cavern, the nuclear fuel powerhouse cavern, and the nuclear auxiliary powerhouse cavern communicate with the first primary traffic tunnel, the second primary traffic tunnel, the third primary traffic tunnel, the fourth primary traffic tunnel, and the primary steam channel.

The safe powerhouse cavern, the nuclear fuel powerhouse cavern, the connecting powerhouse cavern, the nuclear auxiliary powerhouse cavern, and the electric powerhouse cavern are configured with top adits at the top layers for communicating with the second primary adit, the third primary adit, and the fourth primary adit.

As possessing the highest top arches, the two primary caverns are unable to share common construction channels with other caverns either on the vertical face or the horizontal face, thus, a separate first primary adit is arranged. The first primary adit is bifurcated to form two top adits of the two primary caverns respectively connected to the skewbacks of the two primary caverns.

The construction layout of the invention has fewest construction channels arranged according to the ore pass method. The construction layout of the invention is short, safe, economic, highly modularized, and convenient in construction, which satisfies the general requirement of the construction.

DETAILED DESCRIPTION OF THE EMBODIMENTS

For further illustrating the invention, experiments detailing a construction layout for caverns of an underground nuclear power plant are described below. It should be noted that the following examples are intended to describe and not to limit the invention.

Figure 1:
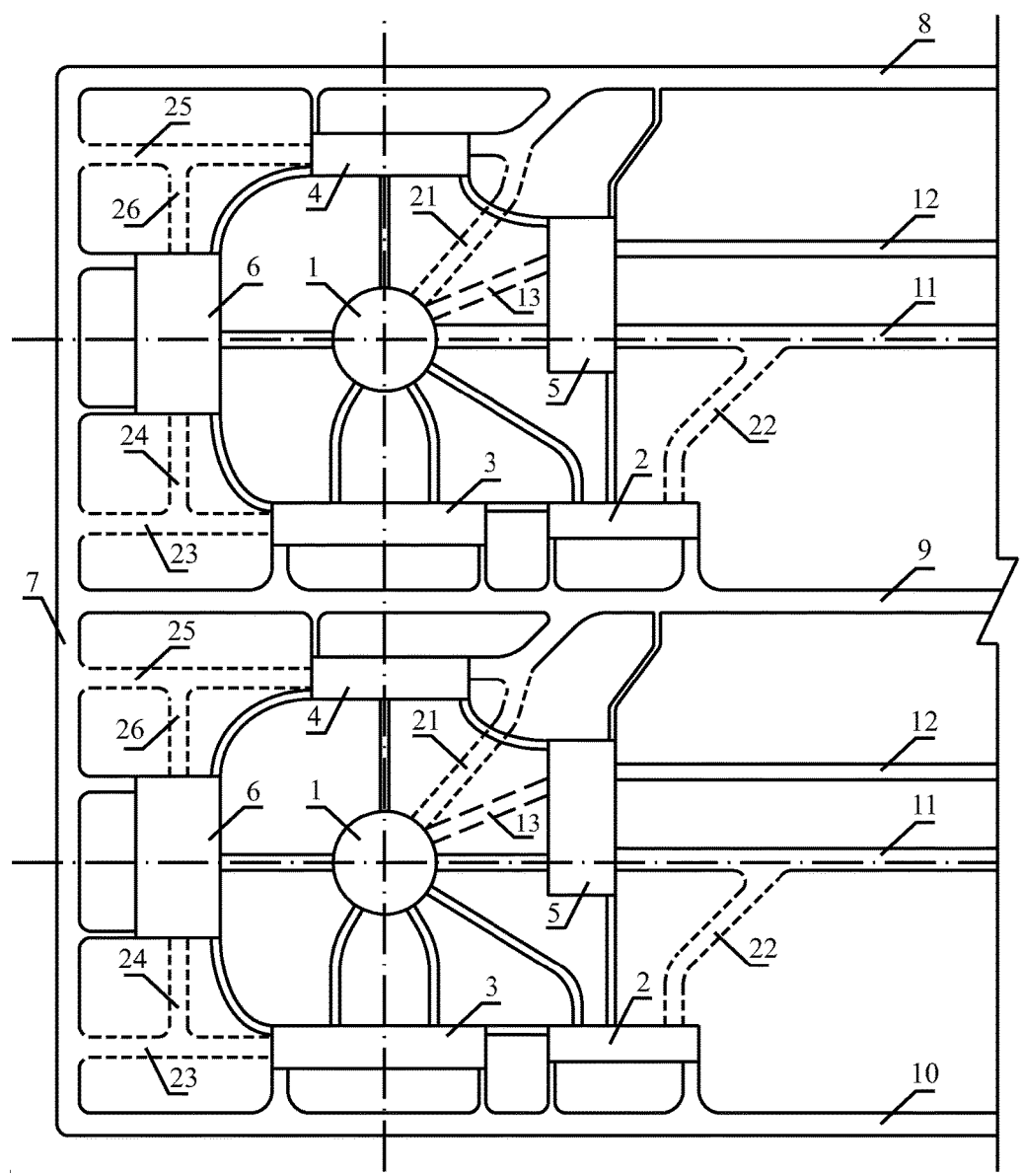
FIG. 1 is a structure diagram of a ground adit system of a construction layout of caverns of an underground nuclear power plant in accordance to one embodiment of the invention.
Figure 2:
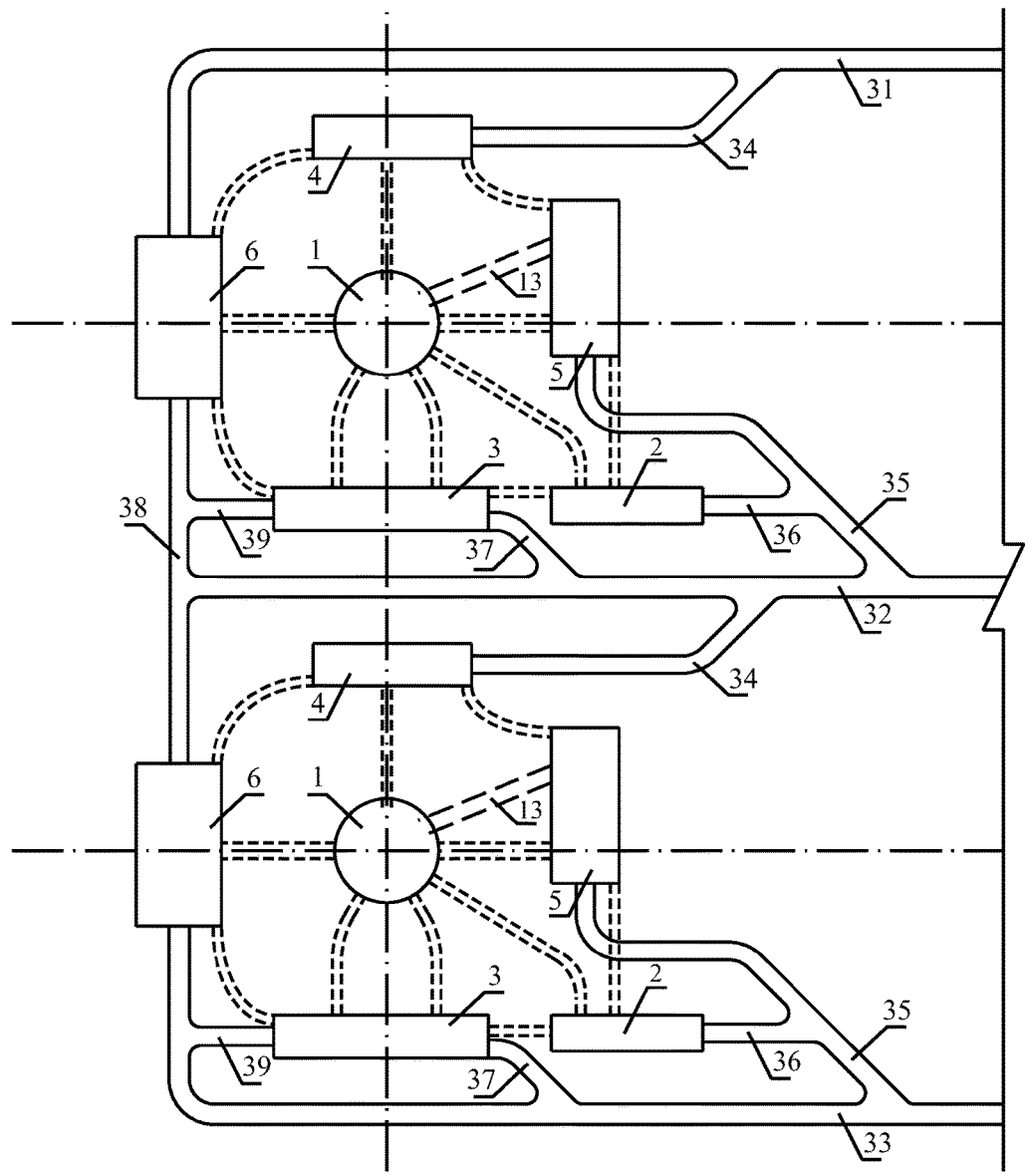
FIG. 2 is a structure diagram of a top adit system, combined caverns, electric powerhouse caverns, and pressure relief caverns of a construction layout of caverns of an underground nuclear power plant in accordance to one embodiment of the invention.
Figure 3:
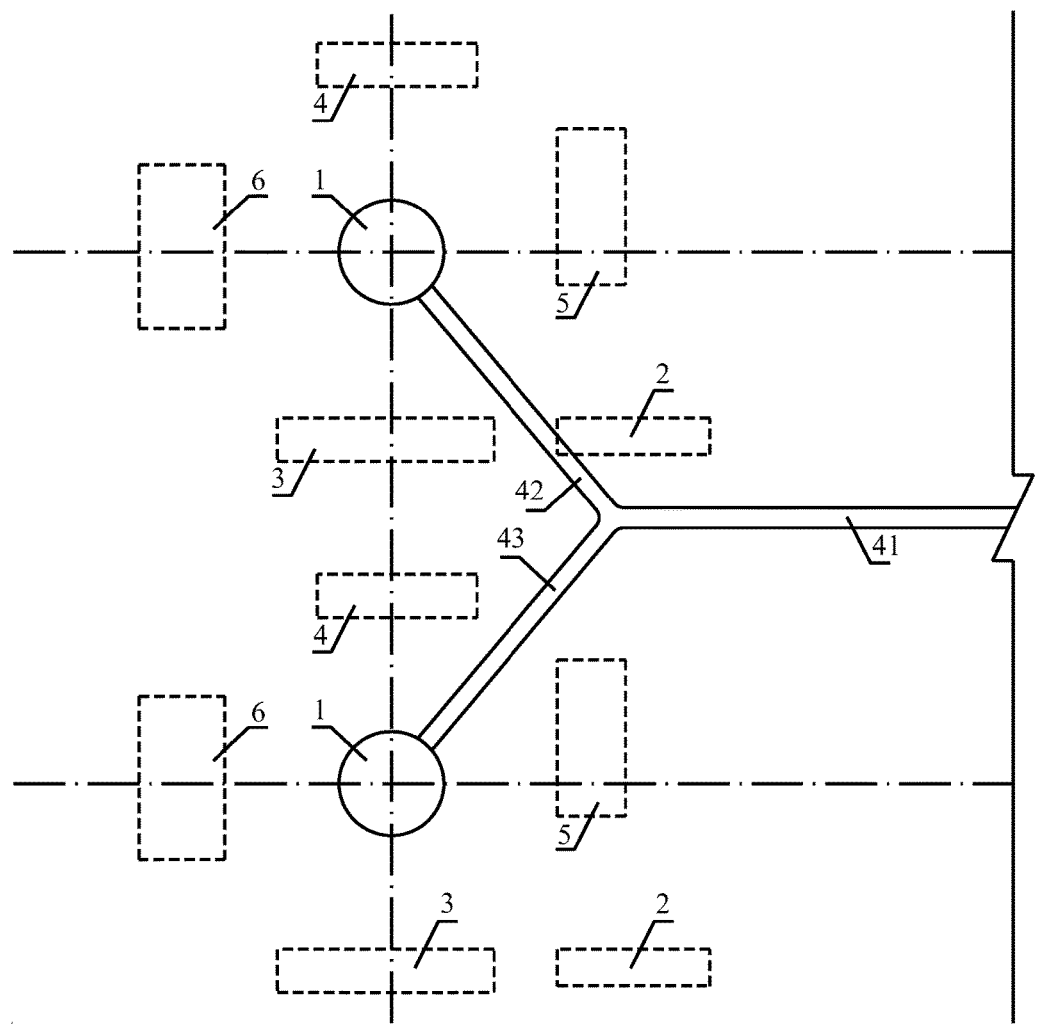
FIG. 3 is a structure diagram of primary caverns and a top adit system of a construction layout of caverns of an underground nuclear power plant in accordance to one embodiment of the invention.

As shown in FIGS. 1-3, a construction layout for caverns of an underground nuclear power plant comprises: two primary caverns accommodating nuclear reactor powerhouses 1, electric powerhouse caverns 2, safe powerhouse caverns 3, nuclear fuel powerhouse caverns 4, connecting powerhouse caverns 5, auxiliary powerhouse caverns 6, fourth primary traffic tunnel 7, first primary traffic tunnel 8, second primary traffic tunnel 9, third primary traffic tunnel 10, a top adit system, a bottom adit system, a primary steam channel 11, a second device conveying channel 12, and a first device conveying channel 13.

Two primary caverns accommodating nuclear reactor powerhouses 1 are provided. A connecting line of medial axes of the two primary caverns is perpendicular to a longitudinal direction of a mountain. The electric powerhouse cavern 2, the safe powerhouse cavern 3, the nuclear auxiliary powerhouse cavern 6, the nuclear fuel powerhouse cavern 4, and the connecting powerhouse cavern 5 are arranged in a circle surrounding each primary cavern 1. Electric powerhouse caverns 2, safe powerhouse caverns 3, and nuclear fuel powerhouse caverns 4 are arranged along the longitudinal direction of the mountain. auxiliary powerhouse caverns 6 and connecting powerhouse caverns 5 are arranged perpendicular to the longitudinal direction of the mountain. Each of the safe powerhouse caverns 3 and each of the nuclear fuel powerhouse caverns 4 are disposed on two sides of each of the two primary caverns 1 in the longitudinal direction of the mountain, respectively. Each of the electric powerhouse caverns 2 and each of the safe powerhouse caverns 3 are located on a same side of each the two primary caverns 1. Each of the auxiliary powerhouse caverns 6 and each of the connecting powerhouse cavern 5 are disposed on two sides of each of the two primary caverns 1 perpendicular to the longitudinal direction of the mountain. A nuclear island powerhouse cavern group is formed by each primary cavern 1 and corresponding electric powerhouse cavern 2, safe powerhouse cavern 3, nuclear auxiliary powerhouse cavern 6, nuclear fuel powerhouse cavern 4, and connecting powerhouse cavern 5. A first primary traffic tunnel 8 and a third primary traffic tunnel 10 are disposed on two sides of two primary caverns in the longitudinal direction of the mountain. A second primary traffic tunnel 9 is disposed between the two primary caverns. The first primary traffic tunnel 8 communicates with the third primary traffic tunnel 10 via a fourth primary traffic tunnel 7. One end of the second primary traffic tunnel 9 communicates with the fourth primary traffic tunnel 7. The other ends of the first primary traffic tunnel 8, the second primary traffic tunnel 9, and the third primary traffic tunnel 10 communicates with a ground surface. Each of the two primary caverns 1 communicates with a corresponding connecting powerhouse cavern 5 via a primary steam channel 11 communicating with the ground surface. A skewback or an endwall of a top arch of each cavern of the nuclear island powerhouse cavern group communicates with the ground surface via a top adit system functioned in construction. A bottom of a sidewall of each cavern of the nuclear island powerhouse cavern group communicates with the first primary traffic tunnel 8, the second primary traffic tunnel 9, the third primary traffic tunnel 10, the fourth primary traffic tunnel 7, and the primary steam channel 11 via a bottom adit system functioned as a slag discharging channel.

The top adit system comprises: a first primary adit 41, a first top adit 42 of a first primary cavern, a second top adit 43 of a second primary cavern, a second primary adit 31, a third primary adit 32, a fourth primary adit 33, third top adits 34 of the nuclear fuel powerhouse caverns, fourth top adits 35 of the connecting powerhouse caverns, fifth top adits 36 of the electric powerhouse caverns, seventh top adits 37 of the safe powerhouse caverns, an eighth top adit 38 of the auxiliary powerhouse caverns, and ninth top adits 39 of the safe powerhouse caverns. An elevation of the first primary adit 41 is higher than an elevation of the second primary adit 31, an elevation of the third primary adit 32, and an elevation of the fourth primary adit 33. The first primary adit 41 is connected to a skewback of a top arche of the first primary cavern 1 and a skewback of a top arche of the second primary cavern 1 via the first top adit 42 and the second top adit 43, respectively. The second primary adit 31 and the fourth primary adit 33 are respectively connected to endwalls of top arches of outer end faces of the two auxiliary powerhouse caverns 6. Two ends of the eighth top adit 38 are respectively connected to endwalls of top arches of inner end faces of the two nuclear auxiliary powerhouse cavern 6. One end of the third primary adit 32 is connected to a middle section of the eighth top adit 38. The second primary adit 31 is connected to an endwall of a top arch of a first nuclear fuel powerhouse cavern 4 via one of the third top adits 34. The third primary adit 32 is connected to an endwall of a top arch of a second nuclear fuel powerhouse cavern 4 via the other of the third top adits 34. The third primary adit 32 is connected to an endwall of a top arch of a first connecting powerhouse cavern 5 via one of the fourth top adits 35. The fourth primary adit 33 is connected to an endwall of a top arch of a second connecting powerhouse cavern 5 via the other of the fourth top adits 35. The fourth top adits 35 of the connecting powerhouse caverns are connected to endwalls of top arches of the electric powerhouse cavern 2 via the fifth top adits 36, respectively. The third primary adit 32 is connected to an endwall of a top arch of one end of a first safe powerhouse cavern 3 via one of the seventh top adits 37. The eighth top adit 38 is branched to form one of the ninth top adits 39 connected to an endwall of a top arche of the other end of the first safe powerhouse cavern 3. One of the ninth top adits 39 is disposed between an inner end face of a first nuclear auxiliary powerhouse cavern 6 and the third primary adit 32. The fourth primary adit 33 is branched to form the other of the seventh top adits 37. The other of the seventh top adits 37 and the other of the ninth top adits 39 are connected to endwalls of top arches of two ends of a second safe powerhouse cavern 3. Each top adit of the top adit system has a longitudinal slope smaller than 12% to satisfy the requirement of trackless transportation.

The bottom adit system comprises: first bottom adits 21 of the two primary caverns, second bottom adits 22 of the electric powerhouse caverns, third bottom adits 23 of the safe powerhouse caverns, fourth bottom adits 24 of the auxiliary powerhouse caverns, fifth bottom adits 25 of the nuclear fuel powerhouse caverns, and sixth bottom adits 26 of the auxiliary powerhouse caverns. The first primary traffic tunnel 8 is connected to a bottom of a sidewall of a first primary cavern 1 via one of the first bottom adits 21. The second primary traffic tunnel 9 is connected to a bottom of a sidewall of a second primary cavern 1 via the other of the first bottom adits 21. Each primary steam channel 11 is connected to a bottom of a sidewall of corresponding electric powerhouse cavern 2 via each second bottom adit 22. The two third bottom adits 23 are disposed on the fourth primary traffic tunnel 7 and are connected to bottoms of endwalls of corresponding safe powerhouse caverns 3. The two fifth bottom adit 25 are disposed on the fourth primary traffic tunnel 7 and are connected to bottoms of endwalls of corresponding nuclear fuel powerhouse caverns 4. The two fifth bottom adit 25 are connected to bottoms of endwalls of one ends of corresponding auxiliary powerhouse caverns 6 via sixth bottom adits 26 of the auxiliary powerhouse caverns. The two third bottom adit 23 are connected to bottoms of endwalls of the other ends of corresponding auxiliary powerhouse caverns 6 via fourth bottom adits 24 of the auxiliary powerhouse caverns. Each bottom adit of the bottom adit system has a longitudinal slope smaller than 15% to satisfy the requirement of trackless transportation.

The two primary caverns 1 are provided with first apparatus conveying channels 13 for communicating with a corresponding connecting powerhouse caverns 5. A bottom of a sidewall of each of the connecting powerhouse caverns 5 communicates with the ground surface via a second apparatus conveying channel 12.

The underground nuclear power plant of this embodiment adopts the CUP 600 arrangement of the double reactors. The ore pass method is adopted to organize the excavation of the underground powerhouse caverns, that is, the excavation is organized on an upper working face, and slags are discharged from a bottom working face via a slag discharging pit. The ore pass method is able to satisfy the construction requirement by fewest construction channels. Thus, it only requires designing the bottom adit system and the top adit system to communicate with the powerhouse caverns. The bottom adits are in bifurcate arrangement based on the first primary traffic tunnel 8, the second primary traffic tunnel 9, and the third primary traffic tunnel 10, and the top adits are in bifurcate arrangement based on the first primary adit 41, the second primary adit 31, the third primary adit 32, and the fourth primary adit 33, which is beneficial for reducing the project quantity of the project construction. The bottom adit system and the top adit system keep a certain distance away from the adjacent caverns for ensuring the stability and safety of the cavern group. The excavated adits are few, the excavated distance is short, and the spaces between the adits and the caverns are proper, so that the cost is saved and the whole project is safe. Because the powerhouse caverns in the CUP600 arrangement of the double reactors adopt modularized design, the modularization design is realized in the structure of the invention, which is specifically as follows.

Because the first primary traffic tunnel 8, the second primary traffic tunnel 9, and the third primary traffic tunnel 10 used as the permanent channels and the primary steam channel 11 optionally used as the channel are all arranged at the elevation of ±0 m, which is greatly different from bottom elevations of the powerhouse caverns except the connecting powerhouse cavern: for example, the bottom elevation of the primary cavern 1 is −9.0 m, the bottom elevation of the electric powerhouse cavern 2 is −7.55 m, and the bottom elevation of the safe powerhouse cavern 3, the nuclear auxiliary powerhouse cavern 6, and the nuclear fuel powerhouse cavern 4 are −12.5 m. Thus, in addition to that the connecting powerhouse cavern 5 is able to directly use the primary steam channel 11 as the construction channel, the first primary traffic tunnel 8, the second primary traffic tunnel 9, the third primary traffic tunnel 10, the fourth primary traffic tunnel 7, and the primary steam channel 11 used as the permanent channels cannot be directly utilized in either a horizontal face or a vertical face. In order to satisfy the requirement for discharging the excavated slag of the cavern bottoms, it is necessary to arrange the bottom adits to the cavern bottoms. In the meanwhile, in order to reduce the excavation rate of the mountain, to reduce the negative factors affecting the stability of the caverns, and to decrease the cost on the bottom adits, no primary bottom adit is individually designed, while the first primary traffic tunnel 8, the second primary traffic tunnel 9, the third primary traffic tunnel 10, the fourth primary traffic tunnel 7, and the primary steam channel 11 used as the permanent channels are fully utilized and bifurcated to form the bottom adits 21, 22, 23, 24, 25, 26, and 27 to reach the bottom elevation of the caverns. The slops of the bottom pits are all smaller than 15% to satisfy the requirement of trackless transportation.

Because the top elevations of the powerhouse caverns are relatively high and vary from one another. For example, the top elevation of the primary cavern 1 is +78.0 m, the top elevation of the electric powerhouse cavern 2 is +46.45 m, the top elevation of the safe powerhouse cavern 3 is +41.5 m, the top elevation of the nuclear auxiliary powerhouse cavern 6 is +47.5 m, and the top elevation of the nuclear fuel powerhouse cavern 4 is +54.5 m, and the top elevation of the connecting powerhouse cavern 5 is +46.0 m, thus the first primary traffic tunnel 8, the second primary traffic tunnel 9, the third primary traffic tunnel 10, the fourth primary traffic tunnel 7, and the primary steam channel 11 functioned as the permanent channels cannot be directly utilized in either a horizontal face or a vertical face. In addition, the elevation of the apparatus conveying channel 12 is +20.0 m, which is greatly different from the elevation of other caverns, thus, it is necessary to design top adits to connect to the skewback or the endwall of the top arch of each cavern. As the top arch of the primary cavern 1 is highest and is unable to share a common construction channel with other caverns in either the vertical face or the horizontal face, the first primary adit 41 is separately designed and bifurcated to form the first top adit 42 and the second top adit 43 to connect to the skewbacks of the top arches of corresponding two primary caverns accommodating nuclear reactor powerhouses 1 having an elevation of +65.0 m. As the electric powerhouse cavern 2, the safe powerhouse cavern 3, the nuclear auxiliary powerhouse cavern 6, the nuclear fuel powerhouse cavern 4, and the connecting powerhouse cavern 5 have small height differences in the vertical face, and these caverns share the second primary adit 31, the third primary adit 32, and the fourth primary adit 33. The second primary adit 31, the third primary adit 32, and the fourth primary adit 33 are bifurcated to form the third top adits 34 of the nuclear fuel powerhouse caverns, the fourth top adits 35 of the connecting powerhouse caverns, the fifth top adits 36 of the electric powerhouse caverns, the seventh top adits 37 of the safe powerhouse caverns, the eighth top adit 38 of the auxiliary powerhouse caverns, and the ninth top adits 39 of the safe powerhouse caverns to communicate with the caverns. The second primary adit 31, the third primary adit 32, and the fourth primary adit 33 are bifurcated to form the top adits 34, 35, 36, 37, 38, and 39, which are further connected to the elevation of the skewbacks of the caverns. Elevations of the top arches of the third top adits 34, the fourth top adits 35, the fifth top adits 36, the seventh top adits 37, the eighth top adit 38, and the ninth top adits 39 are +45.0 m, +37.0 m, +33.0 m, +38.0 m, and +33.0 m, respectively. The fourth top adits 35 is bifurcated to form the fifth top adit 36 to connect to the endwall of the top arch of the electric powerhouse cavern 2 having the elevation of +37.0 m. As the size of the nuclear auxiliary powerhouse cavern 6 is relatively large, the second primary audit 31, the fourth primary adit 33, and the eighth top adit 38 are particularly arranged as the top adits. And the fourth bottom adit 24 and the sixth bottom adit 26 are adopted as the bottom adits. Because the axis of the safe powerhouse cavern 3 is relatively long, the seventh top adit 37 and the ninth top adit 39 are particularly arranged as the top adits so as to enhance the working face, balance the construction period, and facilitate the supporting of the skewbacks therefore ensure the stability and safety during the construction period of the skewbacks. The slops of the top adits are all smaller than 12% to satisfy the requirement of trackless transportation.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

The invention claimed is:

1. A construction layout for caverns of an underground nuclear power plant, the construction layout comprising:
   a) two nuclear island powerhouse cavern groups, each nuclear island powerhouse cavern group comprising:
      a1) a primary cavern accommodating nuclear reactor powerhouse;
      a2) an electric powerhouse cavern;
      a3) a safe powerhouse cavern;
      a4) an auxiliary powerhouse cavern;
      a5) a nuclear fuel powerhouse cavern; and
      a6) a connecting powerhouse cavern;
   b) a first primary traffic tunnel;
   c) a second primary traffic tunnel;
   d) a third primary traffic tunnel;
   e) a fourth primary traffic tunnel;
   f) two primary steam channels;
   g) a bottom adit system; and
   h) a top adit system comprising:
      h1) a first primary adit;
      h2) a second primary adit;
      h3) a third primary adit; and
      h4) a fourth primary adit;
   wherein:
      the electric powerhouse cavern, the safe powerhouse cavern, the nuclear auxiliary powerhouse cavern, the nuclear fuel powerhouse cavern, and the connecting powerhouse cavern are disposed around the corresponding primary cavern;
      a connecting line of centers of cross-sections of the two primary caverns at a horizontal plane is perpendicular to a longitudinal direction of a mountain in which the underground nuclear power plant is constructed, wherein the horizontal plane is parallel to a ground surface and the longitudinal direction of the mountain;
      each of the electric powerhouse cavern, the safe powerhouse cavern, the nuclear auxiliary powerhouse cavern, the nuclear fuel powerhouse cavern, and the connecting powerhouse cavern comprises a rectangular cross-section having a longitudinal axis at the horizontal plane;
      the longitudinal axes of the electric powerhouse cavern, the safe powerhouse cavern, and the nuclear fuel powerhouse cavern are arranged along the longitudinal direction of the mountain; the longitudinal axes of the auxiliary powerhouse cavern and the connecting powerhouse cavern are arranged perpendicular to the longitudinal direction of the mountain and parallel to the ground surface;
      the safe powerhouse cavern and the nuclear fuel powerhouse cavern are disposed on two sides of the primary cavern, respectively; the electric powerhouse cavern and the safe powerhouse cavern are located on a same side of the primary cavern; the auxiliary powerhouse cavern and the connecting powerhouse cavern are disposed on two sides of the primary cavern, respectively;
      two primary caverns are disposed between the first primary traffic tunnel and the third primary traffic tunnel; the second primary traffic tunnel is disposed between the two primary caverns;
      the fourth primary traffic tunnel is disposed perpendicular to the longitudinal direction of the mountain and parallel to the ground surface;
      the fourth primary traffic tunnel is connected to the first primary traffic tunnel, the second primary traffic tunnel, and the third primary traffic tunnel;
      one of the two nuclear island powerhouse cavern groups is surrounded by the fourth primary traffic tunnel together with the first primary traffic tunnel and the second primary traffic tunnel, and the other of the two nuclear island powerhouse cavern groups is surrounded by the fourth primary traffic tunnel together with the second primary traffic tunnel and the third primary traffic tunnel;
      the primary cavern communicates with the corresponding connecting powerhouse cavern via one of the two primary steam channels;
      the first primary adit, the second primary adit, the third primary adit, and the fourth primary adit of the top adit system are disposed along the longitudinal direction of the mountain, and are connected to the ground surface;
      skewbacks or endwalls of top arches of the caverns of each nuclear island powerhouse cavern group communicate with the ground surface via the first primary adit, the second primary adit, the third primary adit, and the fourth primary adit of the top adit system;
      the first primary traffic tunnel, the second primary traffic tunnel, the third primary traffic tunnel, and the two primary steam channels are disposed along the longitudinal direction of the mountain, and are connected to the ground surface;
      bottoms of sidewalls of the caverns of each nuclear island powerhouse cavern group communicate with the first primary traffic tunnel, the second primary traffic tunnel, the third primary traffic tunnel, the fourth primary traffic tunnel, and the primary steam channel via the bottom adit system, and the bottoms of sidewalls of the caverns of each nuclear island powerhouse cavern group communicate with the ground surface via the first primary traffic tunnel, the second primary traffic tunnel, the third primary traffic tunnel, and the primary steam channel;
      the first primary adit, the second primary adit, the third primary adit, and the fourth primary adit are disposed at a higher elevation with respect to the first primary traffic tunnel, the second primary traffic tunnel, the third primary traffic tunnel, and the two primary steam channels;
      the first primary adit, the second primary adit, the third primary adit, and the fourth primary adit are adapted for construction; and
      the first primary traffic tunnel, the second primary traffic tunnel, the third primary traffic tunnel, and the two primary steam channels are adapted for slag discharge.

2. The construction layout of claim 1, wherein the top adit system further comprises: a first top adit of a first primary cavern, a second top adit of a second primary cavern, third top adits of the nuclear fuel powerhouse caverns, fourth top adits of the connecting powerhouse caverns, fifth top adits of the electric powerhouse caverns, seventh top adits of the safe powerhouse caverns, an eighth top adit of the auxiliary powerhouse caverns, and ninth top adits of the safe powerhouse caverns;

an elevation of the first primary adit is higher than an elevation of the second primary adit, an elevation of the third primary adit, and an elevation of the fourth primary adit; the first primary adit is connected to skewbacks of top arches of the two primary caverns;

the second primary adit and the fourth primary adit are respectively connected to endwalls of top arches of outer end faces of the auxiliary powerhouse caverns; two ends of the eighth top adit are respectively connected to endwalls of top arches of inner end faces of the two nuclear auxiliary powerhouse cavern; one end of the third primary adit is connected to a middle section of the eighth top adit;

the second primary adit is connected to an endwall of a top arch of a first nuclear fuel powerhouse cavern via one of the third top adits; the third primary adit is connected to an endwall of a top arch of a second nuclear fuel powerhouse cavern via the other of the third top adits;

the third primary adit is connected to an endwall of a top arch of a first connecting powerhouse cavern via one of the fourth top adits; the fourth primary adit is connected to an endwall of a top arch of a second connecting powerhouse cavern via the other of the fourth top adits; the fourth top adits are connected to endwalls of top arches of the electric powerhouse caverns via the fifth top adits, respectively; and the third primary adit is connected to an endwall of a top arch of one end of a first safe powerhouse cavern via one of the seventh top adits; the eighth top adit is branched to form one of the ninth top adits connected to an endwall of a top arch of the other end of the first safe powerhouse cavern; one of the ninth top adits is disposed between an inner end face of a first nuclear auxiliary powerhouse cavern and the third primary adit; the fourth primary adit is branched to form the other of the seventh top adits; and the other of the seventh top adits and the other of the ninth top adits are connected to endwalls of top arches of two ends of a second safe powerhouse cavern.

3. The construction layout of claim 1, wherein the two primary caverns are provided with first apparatus conveying channels for communicating with corresponding connecting powerhouse caverns; and a bottom of a sidewall of each of the connecting powerhouse caverns communicates with the ground surface via a second apparatus conveying channel.

4. The construction layout of claim 2, wherein, each top adit of the top adit system has a longitudinal slope smaller than 12%.

5. The construction layout of claim 2, wherein
the bottom adit system comprises: first bottom adits of the two primary caverns, second bottom adits of the electric powerhouse caverns, third bottom adits of the safe powerhouse caverns, fourth bottom adits of the auxiliary powerhouse caverns, fifth bottom adits of the nuclear fuel powerhouse caverns, and sixth bottom adits of the auxiliary powerhouse caverns;

the first primary traffic tunnel is connected to a bottom of a sidewall of a first primary cavern via one of the first bottom adits; the second primary traffic tunnel is connected to a bottom of a sidewall of a second primary cavern via the other of the first bottom adits;

each primary steam channel is connected to a bottom of a sidewall of corresponding electric powerhouse cavern via each second bottom adit;

the two third bottom adits are disposed on the fourth primary traffic tunnel and are connected to bottoms of endwalls of corresponding safe powerhouse caverns; the two fifth bottom adit are disposed on the fourth primary traffic tunnel and are connected to bottoms of endwalls of corresponding nuclear fuel powerhouse caverns;

the two fifth bottom adit are connected to bottoms of endwalls of one ends of corresponding auxiliary powerhouse caverns via sixth bottom adits of the auxiliary powerhouse caverns; and the two third bottom adit are connected to bottoms of endwalls of the other ends of corresponding auxiliary powerhouse caverns via fourth bottom adits of the auxiliary powerhouse caverns.

6. The construction layout of claim 2, wherein the two primary caverns are provided with first apparatus conveying channels for communicating with corresponding connecting powerhouse caverns; and a bottom of a sidewall of each of the connecting powerhouse caverns communicates with the ground surface via a second apparatus conveying channel.

7. The construction layout of claim 4, wherein the two primary caverns are provided with first apparatus conveying channels for communicating with corresponding connecting powerhouse caverns; and a bottom of a sidewall of each of the connecting powerhouse caverns communicates with the ground surface via a second apparatus conveying channel.

8. The construction layout of claim 5, wherein each bottom adit of the bottom adit system has a longitudinal slope smaller than 15%.

9. The construction layout of claim 5, wherein the two primary caverns are provided with first apparatus conveying channels for communicating with corresponding connecting powerhouse caverns; and a bottom of a sidewall of each of the connecting powerhouse caverns communicates with the ground surface via a second apparatus conveying channel.

10. The construction layout of claim 8, wherein the two primary caverns are provided with first apparatus conveying channels for communicating with corresponding connecting powerhouse caverns; and a bottom of a sidewall of each of the connecting powerhouse caverns communicates with the ground surface via a second apparatus conveying channel.

* * * * *